United States Patent
Gustafson (12)

(10) Patent No.: US 11,668,437 B2
(45) Date of Patent: Jun. 6, 2023

(54) DEVICE AND METHOD FOR FILLING CRYOGENIC TANKS

(71) Applicant: Chart Inc., Ball Ground, GA (US)

(72) Inventor: Erik Gustafson, Woodstock, GA (US)

(73) Assignee: Chart Inc., Ball Ground, GA (US)

( * ) Notice: Subject to any disclaimer, the term of this patent is extended or adjusted under 35 U.S.C. 154(b) by 15 days.

(21) Appl. No.: 17/524,458

(22) Filed: Nov. 11, 2021

(65) Prior Publication Data

US 2022/0146046 A1 May 12, 2022

Related U.S. Application Data

(60) Provisional application No. 63/112,803, filed on Nov. 12, 2020.

(51) Int. Cl.
*F17C 5/02* (2006.01)
*G05D 16/00* (2006.01)

(52) U.S. Cl.
CPC .......... *F17C 5/02* (2013.01); *G05D 16/028* (2019.01); *F17C 2205/0338* (2013.01); *F17C 2225/0161* (2013.01); *F17C 2227/0142* (2013.01); *F17C 2250/03* (2013.01); *F17C 2250/043* (2013.01); *F17C 2250/0636* (2013.01)

(58) Field of Classification Search
CPC .......... F17C 5/02; F17C 2205/0338; F17C 2225/0161; F17C 2227/0142; F17C 2250/03; F17C 2250/043; F17C 2250/0636; G05D 16/028
USPC .......................................... 141/1
See application file for complete search history.

(56) References Cited

U.S. PATENT DOCUMENTS

| 9,863,370 | B2 | 1/2018 | Jansson et al. |
| 11,384,903 | B2 * | 7/2022 | Beuneken ............... F17C 13/04 |
| 2004/0055316 | A1 * | 3/2004 | Emmer ..................... F17C 7/04 |
| | | | 62/50.6 |
| 2014/0007943 | A1 | 1/2014 | Mackey et al. |
| 2020/0208778 | A1 | 7/2020 | Patelczyk et al. |

FOREIGN PATENT DOCUMENTS

| FR | 2941767 A1 | 8/2010 |
| FR | 3089600 A1 | 6/2020 |
| WO | 2020/115393 A1 | 6/2020 |

OTHER PUBLICATIONS

International Search Report and Written Opinion dated Feb. 18, 2022 for International Application No. PCT/US2021/058946.

* cited by examiner

*Primary Examiner* — Timothy P. Kelly
*Assistant Examiner* — Christopher M Afful
(74) *Attorney, Agent, or Firm* — Cook Alex Ltd.

(57) ABSTRACT

A body structure has an inlet port that receives fluid, a first outlet port that connects to a top-fill line of a cryogenic tank, a second outlet port that connects to a bottom-fill line of a cryogenic tank and a slider tube cylinder. A cylinder housing connects to the body structure and has a pressure comparison cylinder with upper and lower volumes, with the latter in fluid communication with a cryogenic tank. A piston having a piston shaft slides within the pressure comparison cylinder. A pressure regulator is in fluid communication with the upper volume and the slider tube cylinder. A slider tube is connected to the piston shaft and slides within the slider tube cylinder. The slider tube cylinder selectively directs fluid to a top-fill line through the first outlet port or to a bottom-fill line through the second outlet port.

9 Claims, 5 Drawing Sheets

DEVICE AND METHOD FOR FILLING CRYOGENIC TANKS

CLAIM OF PRIORITY

This application claims the benefit of U.S. Provisional Application No. 63/112,803, filed Nov. 12, 2020, the contents of which are hereby incorporated by reference.

FIELD OF THE DISCLOSURE

The present disclosure relates generally to devices and methods for filing a cryogenic tank and, more particularly, to a device and method that fills a cryogenic tank with cryogenic fluid while automatically maintaining a predetermined setpoint pressure in the cryogenic tank.

BACKGROUND

Cryogenic fluids, that is, fluids having a boiling point generally below −150° C. at atmospheric pressure, are used in a variety of applications, such as mobile and industrial applications. Cryogenic fluids are stored in insulated cryogenic tanks because of the low temperature requirements (∼−160° C.) and typically at lower pressures. Temperature and pressure regulation of cryogenic fluids in these tanks is extremely important.

Cryogenic tanks are typically filled from a mobile delivery unit that connects to the cryogenic tank. FIG. 1 illustrates a typical prior art example of system for filling a cryogenic tank. In the illustrated embodiment, the delivery unit connects to a cryogenic tank with a single point of connection for filling. The cryogenic tank system, indicated in general at 11, includes a cryogenic tank 1 with an inner shell 14 and an outer shell 17. Tank 1 contains a cryogenic liquid portion 3 and vapor headspace 2. Cryogenic tank 1 is in communication with a delivery device by delivery line 4 at delivery inlet 5. Delivery line 4 branches at intersection/junction 6 into two separate lines 7 and 8 in communication with the cryogenic tank 1. The first line 7 includes a path to top-fill the tank and the second line 8 includes a path to bottom-fill the tank. Each pathway contains at least one valve, which can be throttled to allow a desired amount of flow through each pathway. First line 7 is shown with valve 9 and second line 8 is shown with valve 10. Valves 9 and 10 are typically globe valves.

The cryogenic tank 1 is filled by introducing cryogenic fluid from a delivery device at inlet 5 through delivery line 4. The valves 9 and 10 on tank lines 7 and 8 are manually adjusted in order to deliver the fluid to the tank through the desired pathway. The cryogenic tank can be top-filled (i.e. the incoming fluid is sprayed into the vapor space 2 of the tank) through line 7 by opening valve 9. The tank can also be bottom filled through line 8 by opening valve 10. The cryogenic fluid being transferred from the mobile delivery unit is usually subcooled to some degree. That is, the pressure of the fluid as it flows through the transfer lines is greater than the saturation pressure of the fluid. When the fluid is transferred in this subcooled manner it does not boil in the lines and is thus transferred efficiently. The utility of having one path to top-fill the tank and one to bottom-fill the tank is for pressure balancing. Top-filling cools the vapor space 2 of the tank and reduces the tank pressure, which allows the tank to be filled without venting. On the other hand, bottom-filling the tank (i.e. the incoming fluid pushed into the liquid space by a dip tube or bottom nozzle) causes the liquid level to rise acting like a piston and increasing tank pressure.

The above-described system requires manual adjustment of the fill valves and monitoring during the fill process to maintain a desired cryogenic tank pressure. Maintaining a desired cryogenic tank pressure during filling therefore requires operators with a high level of skill, training and experience.

SUMMARY OF THE DISCLOSURE

There are several aspects of the present subject matter which may be embodied separately or together in the methods, devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a device for filling a cryogenic tank includes a body structure, a pressure comparison cylinder, a piston, a pressure regulator, and a slider tube. The body structure includes an inlet port for receiving fluid from a delivery tank, a first outlet port configured to connect to a top-fill line in communication with a cryogenic tank, a second outlet port configured to connect to a bottom-fill line in communication with a cryogenic tank, and a slider tube cylinder. The cylinder housing is connected to the body structure and defines a pressure comparison cylinder having an upper volume and a lower volume. The lower volume is in fluid communication with a cryogenic tank. The piston is slidably positioned in the pressure comparison cylinder and a piston shaft connects the piston to the slider tube. The pressure regulator is in fluid communication with the upper volume of the pressure comparison cylinder and the slider tube cylinder. The slider tube is slidably positioned within the slider tube cylinder. The slider tube cylinder is configured to direct fluid to the top-fill line through the first outlet port when a pressure in the lower volume exceeds a setpoint pressure and to direct fluid to the bottom-fill line through the second outlet port when the pressure in the lower volume is below the setpoint pressure.

In another aspect, a method for filling a cryogenic tank includes the steps of providing a fluid flow stream from a delivery tank to an inlet port of a filling device; comparing a pressure of the cryogenic tank with a setpoint pressure using the filling device; diverting fluid from the fluid flow stream to a top-fill line in communication with the cryogenic tank when the cryogenic tank pressure exceeds the setpoint pressure and diverting fluid from the fluid flow stream to a bottom-fill line in communication with the cryogenic tank when the cryogenic tank pressure is below the setpoint pressure.

DETAILED DESCRIPTION OF EMBODIMENTS

An embodiment of the filing device of the disclosure provides a piston that compares a target setpoint pressure with the pressure of the tank being filled with cryogenic fluid and selectively diverts a flow stream to a top-fill and/or a bottom-fill pathway, or portions of flow to each pathway, based on the comparison, thus reducing or eliminating the need for monitoring and manually diverting the flow stream while operating the filling device to deliver cryogenic fluid to the tank.

Figure 1:
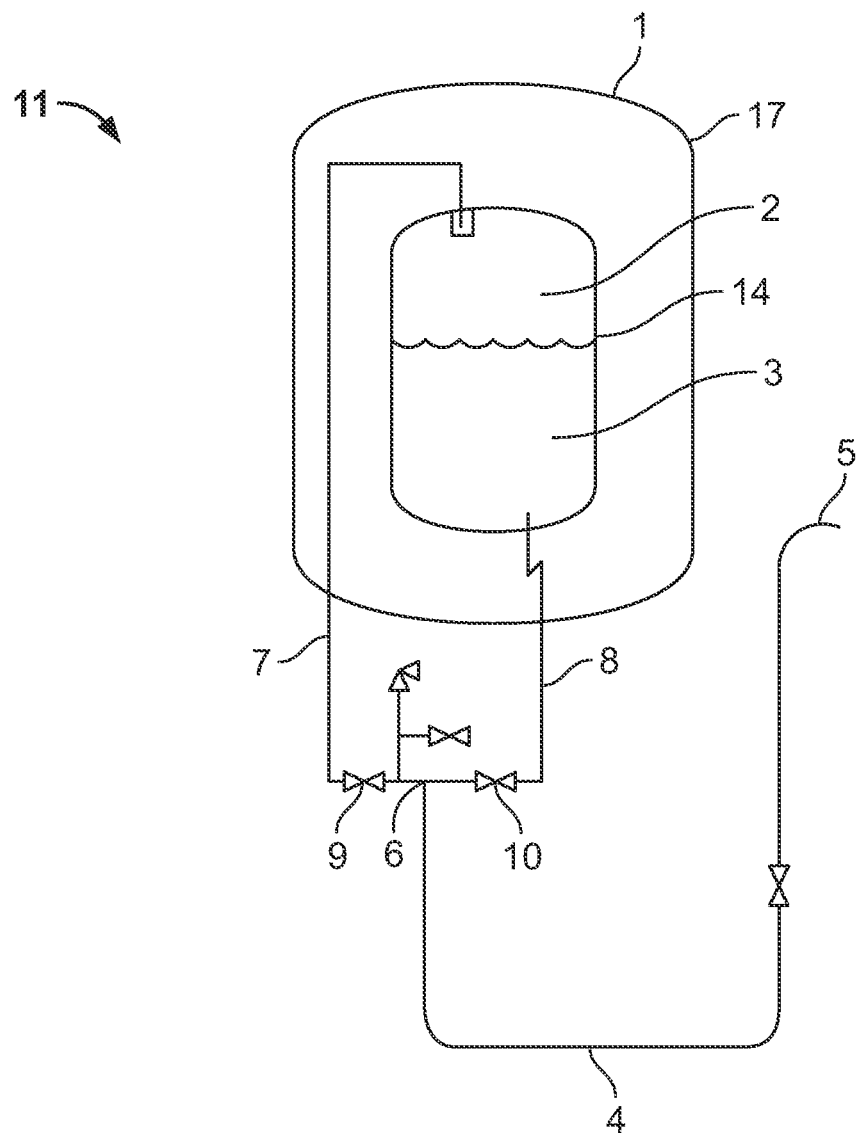
FIG. 1 is a schematic illustration of a prior art system for filling a cryogenic tank.
Figure 2:
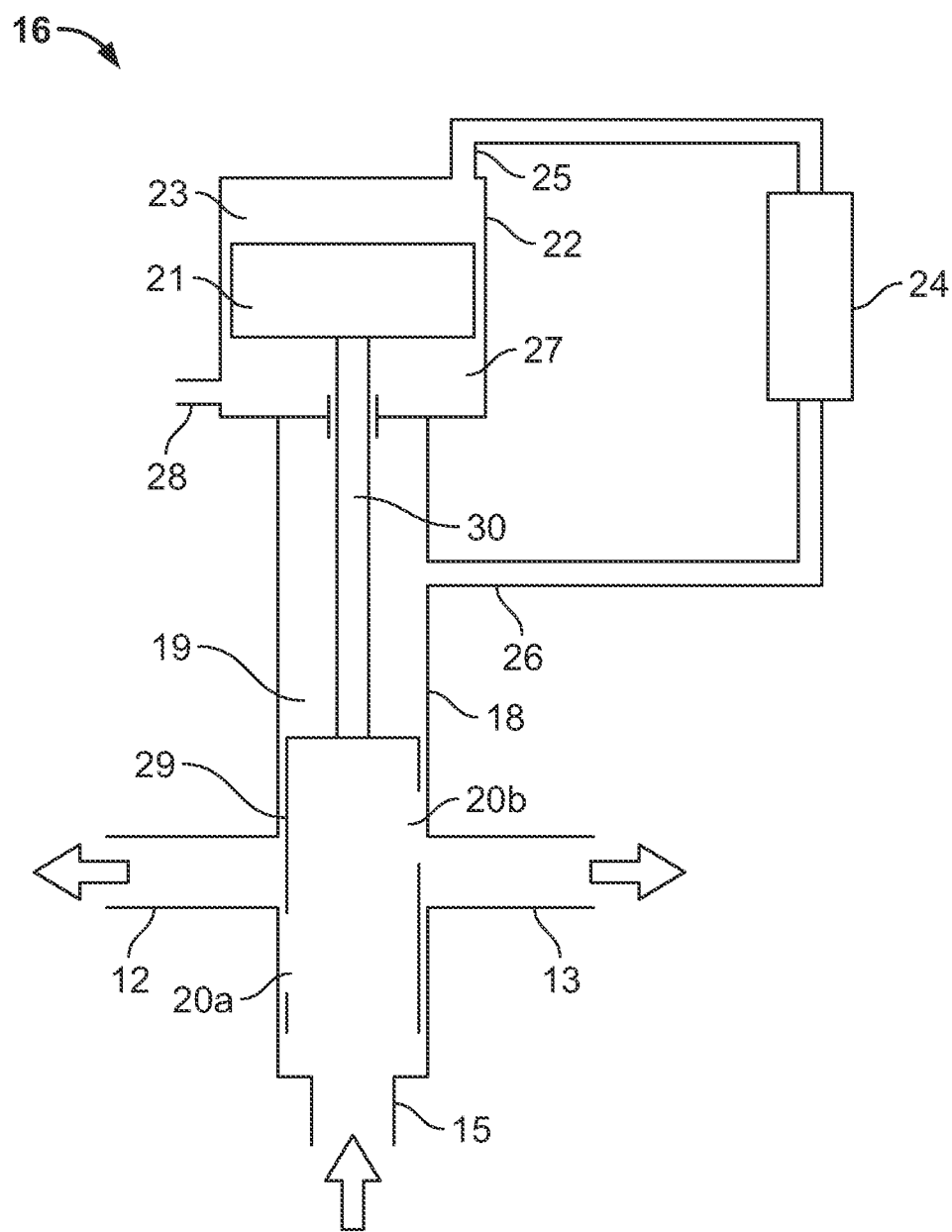
FIG. 2 is a schematic illustration of an embodiment of the filling device of the disclosure.

FIG. 2 illustrates an embodiment of the filling device 16 of the current disclosure. Filling device 16 delivers cryogenic fluid to a cryogenic tank. The filling device includes a body structure 18, a cylinder housing 22, a piston 21, a pressure regulator 24, and a slider tube 29.

As an example only, the body structure 18 may be tube-shaped. The body structure includes an inlet port 15 for receiving fluid from a delivery tank (such as the tank of a mobile delivery unit) or an alternative delivery device or system. The body structure also includes a first outlet port 12 to a top-fill line in communication with a cryogenic tank being filled and a second outlet port 13 to a bottom-fill line in communication with the cryogenic tank. The body structure 18 defines a slider tube cylinder 19 that slidably receives a slider tube 29. The slider tube 29 is able to slide up and down freely inside the slider tube cylinder 19.

Although specific detail is not shown in the figures, both the inlet and outlet ports can feature a number of specific fittings. For instance, each port may comprise a removable and reusable seal. Each port may also include a valve or vent. The inlet port 15 is connected to a delivery tank or other delivery device during filling, such as by a flexible hose or insulated piping.

The cylinder housing 22 defines a pressure comparison cylinder that slidably receives the piston 21. The piston is able to slide up and down freely inside the pressure comparison cylinder. The pressure comparison cylinder includes two separate volume cavities: an upper volume 23 and a lower volume 27. The upper volume 23 is maintained at a predetermined setpoint pressure by the pressure regulator 24, as will be explained below. The lower volume 27 is in fluid communication with the headspace of the cryogenic tank being filled via port 28 and therefore is maintained at the cryogenic tank pressure. The piston 21 preferably includes a seal between the piston 21 and the interior surface of the wall of the pressure comparison cylinder defined by cylinder housing 22 eliminating any type of communication or gas exchange between the upper volume 23 and the lower volume 27.

A piston shaft 30 is connected to the piston head 21 and the slider tube 29. The piston shaft 30 also preferably includes a seal preventing exchange of fluid between the pressure comparison cylinder defined by cylinder housing 22 and the slider tube cylinder 19 of body structure 18.

As noted previously, pressure regulator 24, which is preferably a relieving pressure regulator, is used to maintain the pressure in upper volume 23 of the cylinder housing 22 at a generally constant setpoint pressure. Suitable pressure regulators are well known in the art and may include at least a valve that opens based on the pressure setting or setpoint to permit fluid to either enter the upper volume 23 (if the pressure within the upper volume is below the setpoint) or exit the upper volume (if the pressure within the upper volume is above the setpoint). The pressure regulator 24 is connected to the upper volume 23 of the pressure comparison cylinder and the slider tube cylinder 19 through communication lines 25 and 26, respectively.

Piston 21 will move downward when the cryogenic tank pressure (which equals the pressure within lower volume 27) is below the setpoint pressure of regulator 24 and will move upward when cryogenic tank pressure exceeds the setpoint of regulator 24. In the latter instance, excess pressure caused by the displacement of piston 21 upwards is vented from the upper volume 23 to the atmosphere by pressure regulator 24 (via line 25), keeping upper volume 23 generally at constant setpoint pressure. When the pressure within the lower volume 27 (i.e. the cryogenic tank pressure) of the pressure comparison cylinder drops below the setpoint pressure, and thus the pressure within the upper volume 23, piston 21 will lower. As this occurs, the regulator 24 opens and pressurized fluid from the upper portion of slide tube cylinder 19 travels through lines 26 and 25 into the upper volume 23 so that the setpoint pressure may be maintained. When the setpoint pressure is reached within the upper volume 23, and downwards movement of piston 21 ceases, the regulator 24 closes.

The slider tube cylinder 29 is configured to direct a greater portion of fluid from a flow stream entering inlet port 15 of the device to a cryogenic tank top-fill line through the first outlet port 12 (to decrease the cryogenic tank pressure) when a pressure in the lower volume 27 of the pressure comparison cylinder exceeds a pressure setpoint and to direct fluid to a cryogenic tank bottom-fill line through the second outlet port 13 (to increase the cryogenic tank pressure) when the pressure in the lower volume 27 is below a pressure setpoint. The slider tube 29 has slots, holes or other openings 20a, 20b that direct flow of the cryogenic fluid from the inlet 15 to the top-fill line outlet 12 and/or the bottom-fill line outlet 13 depending on the position of the slider tube 29. Although one slot is shown on each side of the slider tube, the slider tube may include more than two slots/holes. The holes or slots 20a, 20b may be any shape. They may be circular, rectangular, or any other known shape. In one embodiment, the slots are teardrop shaped so as to provide a variable flow rate based on the position of the slider tube 29 within the slider tube cylinder 19.

A design element that may be exploited by the fact that the fill pressure (pressure of the fluid entering through inlet port 15) always exceeds tank pressure is the relationship between the cross-sectional area of piston shaft 30 and the weight of the piston-shaft-slider tube assembly. If the pressure drop from the body structure 18 to the cryogenic tank during normal fill operations is known, the weight of the piston-shaft-slider tube assembly may be selected to match the excess upward force on piston 21. Ideally, there is no net force on the piston-shaft slider tube assembly when cryogenic tank pressure exactly equals the setpoint pressure (the pressures in lower chamber 27 and upper chamber 23, respectively). The downward force on the piston 21=the force of gravity on the piston-shaft-slider tube assembly+ (pressure in the upper volume 21×cross sectional area of the pressure comparison cylinder). The upward force on the piston 21=the pressure in lower volume 27×(the cross sectional area of pressure comparison cylinder−the cross-sectional area of piston shaft 30)+(the pressure in body structure 18×the cross-sectional area of the piston shaft 30).

The weight of the piston-shaft-slider tube assembly is ideally equal to the pressure drop from body structure 18 to the cryogenic tank multiplied by the cross-sectional area of shaft 30. However, it is not necessary (or possible) to have this tuned exactly because the pressure drop from the body structure 18 to the tank depends on the fill rate, which may vary slightly from one mobile delivery vehicle to another depending on vehicle capabilities.

The filling device 16 of FIG. 2 can be included in a cryogenic fluid delivery system, including a cryogenic fluid bulk tank (in fluid communication with inlet port 15 of FIG. 2), or a cryogenic tank system. An example of the latter is indicated in general at 102 in FIG. 3. The system 102 includes a cryogenic tank 101 having an inner shell 114 and an outer shell 132, where the inner shell defines an interior of the tank. Cryogenic liquid 136 is stored within the interior of the inner shell 114 with a headspace above occupied by cryogenic vapor 134.

Figure 3:
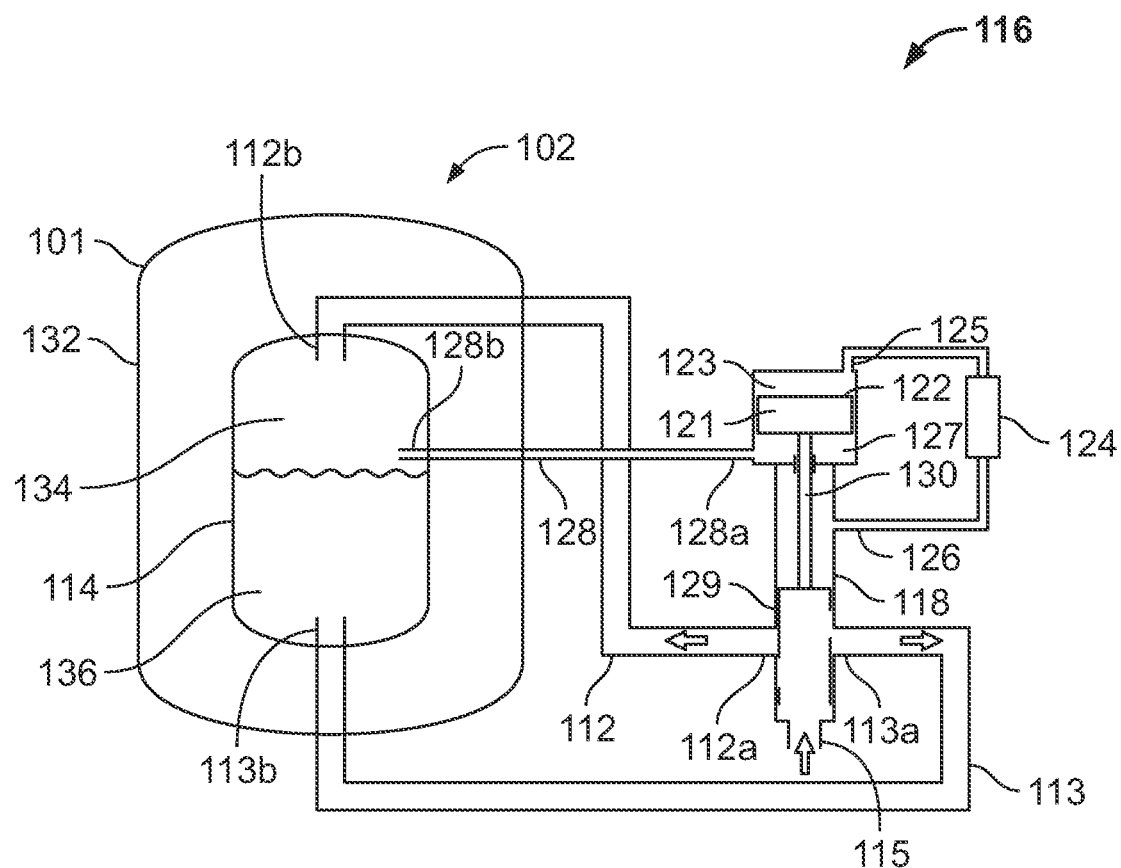
FIG. 3 is a schematic illustration of an embodiment of the filing device of the disclosure incorporated into a cryogenic tank system.

As illustrated in FIG. 3, the cryogenic tank 101 is connected to the filling device 116 by a number of lines. Filling device 116 operates in the same manner as filling device 16 presented in FIG. 2 and described above. Pressure sensing line 128 connects the head space of the cryogenic tank 101 to the filling device 116. More specifically, pressure sensing line 128 connects the lower volume 127 of the cylinder housing at port 128a of the filling device to the headspace of the inner shell 114 of the cryogenic tank at port 128b. Pressure sensing line 128 enables communication between the tank head space and the filling device so that the filling device lower volume 127 and cryogenic tank are maintained at the same pressure. The filling device 116 is also connected to cryogenic tank 101 by filling transfer lines 112 and 113. Top-fill line 112 connects the body structure 118 of filling device 116 at port 112a to the vapor space 134 of the inner shell 114 of the cryogenic tank at port 112b. Bottom-fill line 113 connects the body structure 118 of filling device 116 at port 113a to the cryogenic liquid 136 of the inner shell 114 of the cryogenic tank at port 113b. Although filling lines 112 and 113 are shown as being connected to the inner shell 114 at the top and bottom respectively, the filling lines may be connected to the vapor space and cryogenic liquid portion along either side of the inner shell as well.

With continued reference to FIG. 3, the cryogenic tank 101 is filled by the filling device 116 in the manner described above for filling device 16 of FIG. 2. A cryogenic fluid is provided from a delivery tank or other filling system to the filling device via inlet port 115. The filling device diverts at least a portion of the cryogenic fluid stream entering port 115 to the top-fill line 112 when the pressure within the cryogenic tank 101 exceeds a pressure setpoint and diverts at least a portion of the cryogenic fluid stream entering port 115 to the bottom fill line 113 when the pressure within the cryogenic tank 101 is below the setpoint pressure. As described above, the process is done automatically by the filling device 116. The pressure regulator 124 of FIG. 3 provides generally constant setpoint pressure in upper volume 123 and the piston 121 moves the slider tube 129 based on the pressure within lower volume 127 (pressure of cryogenic tank 101) so that there is little or no change in pressure within the cryogenic tank 101 during filling.

Figure 4:
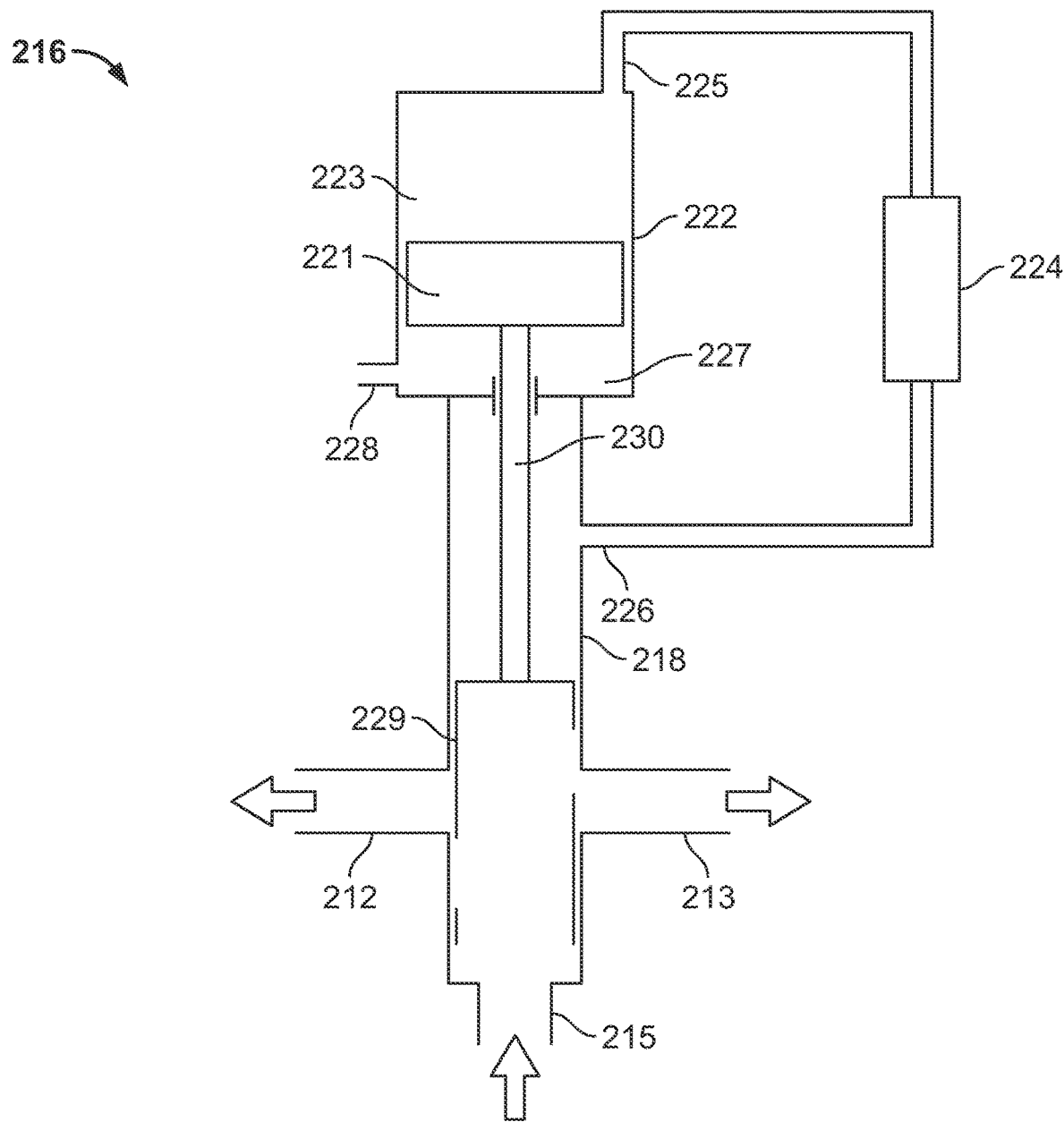
FIG. 4 is a schematic illustration of an alternative embodiment of the filling device of the disclosure.
Figure 5:
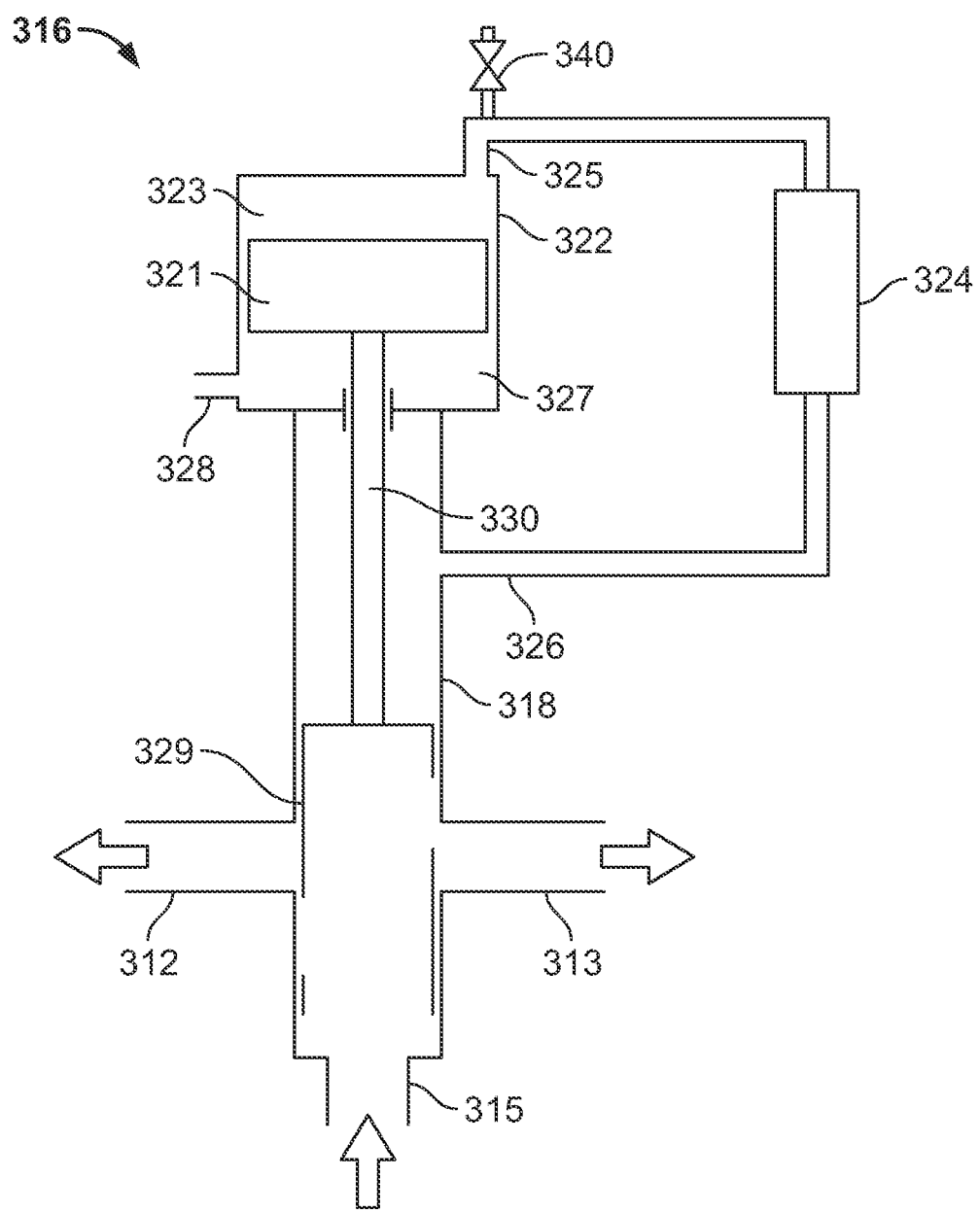
FIG. 5 is a schematic illustration of another alternative embodiment of the filling device of the disclosure.

As described with reference to FIG. 2, the use of relieving pressure regulator 24 allows any excess pressure in upper volume 23 of the filling device 16 to vent to the atmosphere. Other embodiments that accomplish the same task without venting to atmosphere are illustrated in FIGS. 4 and 5. Coordinating components of FIGS. 4 and 5 are numbered similarly to the device components of the FIG. 2 and operate in the same manner.

In the device of FIG. 4, indicated in general at 216, the upper volume 223 of the pressure comparison cylinder is expanded. The functionality of the device 216 is otherwise identical to the device 16 of FIG. 2. The combined volume of upper volume 223 and communication line 225 of FIG. 4 is made to be much larger than the displacement volume of the piston head 221 such that the pressure change is minimal throughout the stroke of the piston. A disadvantage of this approach, however, is that diurnal or annual temperature cycles may still cause the pressure within upper volume 223 to increase in relation to the gas temperature In the device of FIG. 5, indicated in general at 316, a back-pressure control device 340 (such as a back-pressure regulator or a relief valve) has been added to communication line 325 with a setpoint slightly above the setpoint of a (non-relieving) pressure regulator 324. The functionality of the device 316 is otherwise identical to the device 16 of FIG. 2.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A device for filling a cryogenic tank, comprising:
   a body structure including:
      an inlet port for receiving fluid from a delivery device;
      a first outlet port configured to connect to a top-fill line in communication with a cryogenic tank;
      a second outlet port configured to connect to a bottom-fill line in communication with a cryogenic tank;
      a slider tube cylinder;
   a cylinder housing connected to the body structure defining a pressure comparison cylinder having an upper volume and a lower volume, the lower volume in fluid communication with a cryogenic tank;
   a piston slidably positioned in the pressure comparison cylinder;
   a piston shaft connected to the piston;
   a pressure regulator in fluid communication with the upper volume of the pressure comparison cylinder and the slider tube cylinder;
   a slider tube connected to the piston shaft and slidably positioned within the slider tube cylinder, said slider tube cylinder configured to direct fluid to a top-fill line through the first outlet port when a pressure in the lower volume exceeds a pressure setpoint and to direct fluid to a bottom-fill line through the second outlet port when the pressure in the lower volume is below a pressure setpoint.

2. The filling device of claim 1, wherein the slider tube has at least two openings for directing fluid.

3. The filling device of claim 2, wherein the openings are tear shaped.

4. The filling device of claim 1, wherein the pressure regulator is a pressure relieving regulator.

5. The filling device of claim 1, wherein the weight of the piston, shaft and slider tube is about equal to the pressure drop from the body structure to the tank while filling the cryogenic tank multiplied by the cross-sectional area of the piston shaft.

6. The filling device of claim 1, wherein the upper volume of the cylinder housing is larger than the lower volume of the cylinder housing.

7. The filling device of claim 1, further comprising a second pressure regulator in fluid circuit between the upper volume and the pressure regulator.

8. The filling device of claim 1, further comprising a seal between the piston and the pressure comparison cylinder.

9. The filing device of claim 1, further comprising a seal around the piston shaft configured to prevent fluid from flowing between the pressure comparison cylinder and the body structure.

\* \* \* \* \*